(12) United States Patent
Lainema et al.

(10) Patent No.: US 6,711,209 B1
(45) Date of Patent: Mar. 23, 2004

(54) ADAPTIVE MOTION VECTOR FIELD CODING

(75) Inventors: Jani Lainema, Irving, TX (US); Marta Karczewicz, Irving, TX (US)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/489,327

(22) Filed: Jan. 21, 2000

Related U.S. Application Data

(63) Continuation-in-part of application No. 09/371,641, filed on Aug. 11, 1999.

(51) Int. Cl.$^7$ ................................................ H04B 1/66
(52) U.S. Cl. ............. 375/240; 375/240.12; 375/240.16; 375/240.15; 375/240.24; 348/699; 382/236; 382/232; 382/238
(58) Field of Search .......................... 375/240, 240.12, 375/240.16, 240.15, 240.24, 240.08, 240.27; 348/409–413, 699, 402, 407, 415, 416, 420; 382/236, 232, 238

(56) References Cited

U.S. PATENT DOCUMENTS

| | | | |
|---|---|---|---|
| 5,557,341 A | | 9/1996 | Weiss et al. ................. 348/699 |
| 5,778,192 A | | 7/1998 | Schuster et al. ........ 395/200.77 |
| 6,122,320 A | * | 9/2000 | Bellifemine et al. ......... 375/240 |
| 6,163,575 A | * | 12/2000 | Nieweglowski et al. ..................... 375/240.16 |
| 6,212,235 B1 | * | 4/2001 | Nieweglowski et al. ..................... 375/240.08 |
| 6,507,617 B1 | * | 1/2003 | Carczewicz et al. ... 375/240.16 |

FOREIGN PATENT DOCUMENTS

| | | | |
|---|---|---|---|
| EP | 0 691 789 A2 | 10/1996 | ............ H04N/7/26 |
| EP | 0874526 | 10/1998 | |
| GB | 2317525 | 3/1998 | |
| GB | 2329783 | 3/1999 | |
| WO | WO97/16025 | 5/1997 | |
| WO | WO97/40628 | 10/1997 | |

OTHER PUBLICATIONS

Stuhlmueller, KW et al. "Rate–Constrained Contour–Representation for Region–Based Motion Compensation", Proceedings of the SPIE, Mar. 1996, XP000900459, paragraph 003, figure 4.

(List continued on next page.)

*Primary Examiner*—Shawn S. An

(57) ABSTRACT

A method for motion compensated encoding of video data. The method comprises the steps of:

generating a motion vector field of video pixels of a current frame to be coded based on a reference frame;

obtaining segmenting information defining the division of the current frame into image segments;

coding the motion vector field of an image segment $S_k$ to provide compressed motion information comprising a motion coefficient vector $c_k$ comprising a set of motion coefficients $c_i$, such that $c_i \cdot f_i(x,y)$ represents the motion vector field, whereby $f_i(x,y)$ defines a certain set of basis functions, wherein i is an index defining a correspondence between each basis function and a corresponding motion coefficient;

predicting a motion vector field of a subsequent image segment $S_L$ with a set of predicted motion coefficients $p_i$ based upon the previously generated motion coefficient vector $c_k$;

generating for the subsequent segment $S_L$ a set of refinement motion coefficients $r_i$ corresponding to the difference between the set of motion coefficients $c_i$ and a set of predicted motion coefficients $p_i$ such that $p_i + r_i = c_i$.

Another aspects of the invention comprise corresponding video codec, mobile station, telecommunications network and computer program product.

20 Claims, 6 Drawing Sheets

OTHER PUBLICATIONS

Nicolas H et al.: "Temporal Redundancy Reduction Using a Motion Model Hierarchy and Tracking for Image Sequence Coding", SPIE Visual Communications and Image Processing, vol. 2094, Nov. 8, 1993, pp. 1548–1557, XP002050743 (paragraph 0001–00004).

Nguyen Hung Q., et al: "Representation of Motion Information for Image Coding", INRS–Telecommunications, Proc. Picture Coding Symposium '90, Cambridge, Massachusetts, Mar. 26–18, 1990, pp. 841–845.

Sanson, Henri: "Region Based Motion Estimation and Compensation for Digital TV Sequence Coding"; 1993 Picture Coding Symposium, Mar. 17–19, 1993, pp. 1–2.

Cicconi, Pierangela, et al.: "Efficient Region–Based Motion Estimation and Symmetry Oriented Segmentation for Image Sequence Coding" IEEE Transactions on Circuits and Systems for Video Technology, vol. 4, No. 3, Jun. 1994, pp. 357–364.

Nicolas, H., et al. "Region–based motion estimation using deterministic relaxation schemes for image sequence coding" IEEE 1992, pp. 265–268.

International Telecommuncation Union: "Line Transmission of Non–Telephone Signals" Video Codec for Audiovisual Services at p×64 kbits: ITU–T Recommendation H.261 (03/93), pp. 3 and 14.

International Telecommunication Union: "Series H: Audio-visual and Multimedia Systems Infrastructure of audiovisuals services—Coding of moving video" Video coding for low bit rate communication: ITU–T Recommendation H.263 (02/98), p. 7 and 9–11.

International Standard: Information technology—Generic coding of moving pictures and associated audio information: Video Amendment 2: 4:2:2 Profile, First Edition May 15, 1996, Amendment Dec. 15, 1997, ISO/IEC 13818–2:1996/Amd.2:1997(E), pp. 14 and 17–18.

International Standard: Information technology—Coding of audio–visual objects—Part 2: Visual, ISO/IEC FDIS 14496–2: 1999(E), pp. 15–18.

* cited by examiner

ADAPTIVE MOTION VECTOR FIELD CODING

The present application is a continuation-in-part of patent application Ser. No. 09/371,641, filed on Aug. 11, 1999, the contents of which are incorporated by reference herein.

FIELD OF THE INVENTION

The present invention relates to video compression. In particular, the invention relates to coding of an estimated motion field and to generating motion information in a video sequence.

BACKGROUND OF THE INVENTION

Motion compensated prediction is a key element of the majority of video coding schemes. To describe the operation of motion compensated prediction it should be appreciated that each digital image contains certain set of pixels corresponding to certain parts of the image. Each pixel may be represented, for example, as intensities of Red, Green and Blue (RGB color system) or as intensities of the luminance and two chrominance components.

FIG. 1 shows illustratively two segments of an image, $S_k$ and $S_j$, each showing a set of pixels 10 to 15 at old locations, that is in a previous image of a sequence of images. The new locations of these pixels in a current image are shown as positions 10' to 15'. The change of their location, that is their motion, defines respective motion vectors $v^1_k$ to $v^3_k$ and $v^1_j$, $v^3_j$ of the pixels in these segments. At the simplest, the segments are squares or rectangles. Attentively, and in legacy schemes, they may also be of an arbitrary form, as shown in FIG. 1.

FIG. 2 is a schematic diagram of an encoder for compression of video sequences using motion compensation. Essential elements in the encoder are a motion compensated prediction block 1, a motion field estimation block 2 and a motion field coder 3. The operating principle of motion compensating video coders is to compress the prediction error $E_n(x, y)$, which is a difference between the incoming frame $I_n(x, y)$ being coded, called the current frame, and a prediction frame $\hat{I}_n(x, y)$, wherein:

$$E_n(x, y) = I_n(x, y) - \hat{I}_n(x, y) \quad (1)$$

The prediction frame $\hat{I}_n(x, y)$ is constructed by the motion compensated prediction block 1 and is built using pixel values of the previous, or some other already coded frame denoted $\tilde{I}_{ref}(x, y)$, called a reference frame, and the motion vectors of pixels between the current frame and the reference frame. Motion vectors are calculated by the motion field estimation block 2 and the resulting vector field is then coded in some way before being provided as an input to the prediction block 1. The prediction frame is then:

$$\hat{I}_n(x, y) = \tilde{I}_{ref}[x + \tilde{\Delta}x(x, y), y + \tilde{\Delta}y(x, y)] \quad (2)$$

$\Delta x(x, y)$ and $\Delta y(x, y)$ are the values of horizontal and vertical displacement of pixel in location (x, y) and the pair of numbers $[\Delta x(x, y), \Delta y(x, y)]$ is called the motion vector of that pixel. The set of motion vectors of all pixels in the current frame $I_n(x, y)$ is called a motion vector field. The coded motion vector field is transmitted as motion information to the decoder together with encoded prediction error information.

In the decoder, shown in FIG. 3, the current output frame $\tilde{I}_n(x, y)$ is reconstructed by finding the pixels' prediction $\hat{I}_n(x, y)$ in the reference frame $\tilde{I}_{ref}(x, y)$ and adding a decoded prediction error $\hat{E}_n(x, y)$. The motion compensated prediction block 21 generates the prediction frame using the received motion information and the reference frame $\tilde{I}_{ref}(x, y)$. The prediction error decoder 22 generates the decoded prediction error $\hat{E}_n(x, y)$ for adding to the prediction frame, the result being the current output frame $\tilde{I}_n(x, y)$.

The general object of motion compensated (MC) prediction is to minimize amount of information which needs to be transmitted to the decoder together with the amount of prediction error measured, e.g., as the energy of $E_n(x, y)$.

The document H. Nguen, E. Dubois, "Representation of motion information for image coding". Proc. Picture Coding Symposium '90, Cambridge, Mass., Mar. 26–18, 1990, pages 841–845, gives a review of motion field coding techniques. As a rule of thumb, reduction of prediction error requires a more sophisticated motion field model, that is, more bits must be used for its encoding. Therefore, the overall goal of video encoding is to encode the motion vector field as compactly as possible while keeping the measure of prediction error as low as possible.

The motion field estimation block 2, shown in FIG. 2, calculates motion vectors of all the pixels of a given image segment minimizing some measure of prediction error in this segment, for example square prediction error.

Due to the very large number of pixels in the frame, it is not efficient to transmit a separate motion vector for each pixel. Instead, in most video coding schemes, the current frame is divided into larger image segments so that all motion vectors of the segment can be described by few parameters. Image segments may be square blocks, for example, 16×16 and 8×8 pixel blocks are used in codecs in accordance with international standards ISO/IEC MPEG-1, MPEG-2, MPEG-4 or ITU-T H.261 and H.263, or they may comprise arbitrarily shaped regions obtained for instance by a segmentation algorithm. In practice, segments include at least few tens of pixels.

In order to compactly represent the motion vectors of the pixels in a segment, it is desirable that the motion vectors are described by a function of few parameters. Such a function is called a motion vector field model. A known group of models is linear motion model, in which motion vectors are represented by linear combinations of motion field basis functions. In such models, the motion vectors of image segments are described by a general formula:

$$\Delta x(x, y) = \sum_{i=1}^{N} c_i f_i(x, y) \quad (3)$$

$$\Delta y(x, y) = \sum_{i=N+1}^{N+M} c_i f_i(x, y),$$

where parameters $c_i$ are called motion coefficients and are transmitted to the decoder. In general, the motion model for a segment is based on N+M motion coefficients. Functions $f_i(x, y)$ are called motion field basis functions which and are known both to the encoder and decoder. Known motion field estimation techniques vary both in terms of the model used to represent the motion field and in the algorithm for minimization of a chosen measure of the prediction error.

Both the amount and the complexity of the motion varies between frames and between segments. In one case some of the content of the image may be rotated, skewed and shifted from one side of the image to the opposite side of the image. On the other hand, in another case a video camera may turn slowly about its vertical axis so that all the pixels move slightly in horizontal plane. Therefore, it is not efficient to always use all N+M motion coefficients per segment.

One way to reduce motion information is simply to reduce the number of motion coefficients from the motion field model that models the motion of pixels' locations from one image to another. However, the prediction error tends to increases, as the motion field model becomes coarser.

For every segment, it is necessary to determine the minimum number of motion coefficients that yields a satisfactorily low prediction error. The process of such adaptive selection of motion coefficients is called motion coefficient removal. This process is performed in the encoder by the motion field coding block 3, see FIG. 2. It is performed after motion field estimation performed by the motion field estimation block 2.

In future, digital video transmission will be possible between wireless mobile terminals. Usually such terminals have limited space for additional components and operate by a battery so that they are likely not accommodate computing capacity comparable to fixed devices such as desktop computers. Therefore, it is crucial that the motion field coding performed in a video coder is computationally simple so that it does not impose an excessive burden on the processor of the device. Additionally, the encoded motion field model should be computationally simple to facilitate later decoding at a decoder in a receiving (mobile) terminal.

Methods for performing motion estimation with different models and selecting the most suitable one are proposed in the documents H. Nicolas and C. Labit, "Region-based motion estimation using deterministic relaxation schemes for image sequence coding," Proc. 1994 International Conference on Acoustics, Speech and Signal Processing, pp. III 265–268 and P. Cicconi and H. Nicolas, "Efficient region-based motion estimation and symmetry oriented segmentation for image sequence coding," IEEE Tran. on Circuits and Systems for Video Technology, Vol. 4, No. 3, June 1994, pp. 357–364. The methods attempt to adapt the motion model depending on the complexity of the motion by performing motion estimation with different models and selecting the most suitable one. The main disadvantage of these methods is their high computational complexity and the small number of different motion field models that can be tested in practice.

Yet another method is described in WO97/16025. A video codec includes a motion field coder for minimizing the number of motion coefficients of a motion vector field. In the coder, a first block includes means for forming a new matrix representation of the motion vector field. The new coded motion vector field is linear. A second main block includes means for merging pairs of adjacent segments if the combined segment area can be predicted using a common motion field. Merging Information is transmitted to a decoder. A third main block includes means for removing motion field basis functions. After each removing step, the squared prediction error is calculated and removing is continued until the magnitude of the error is not acceptable. Final motion coefficients are calculated by solving a linear matrix equation. As a result, reduced number of motion coefficients for each segment is obtained. The motion coefficients are transmitted to the decoder. This approach allows removal of motion coefficients until a certain threshold of prediction error is reached.

However, there is still a need to further reduce the complexity of the motion encoding process as well as the amount of motion information that needs to be sent to the decoder while causing minimal deterioration in the quality of a decoded image.

An objective of the present invention is to reduce the amount of motion field vector information produced by the motion field estimation block 2 by a large factor without deteriorating the decoded image to a significant extent. Another objective is to keep the complexity of the motion field coder low to allow practical implementation using available signal processors or general-purpose microprocessors.

SUMMARY OF THE INVENTION

The invention is defined by the appended claims.

By taking advantage of the predicted motion coefficients in a Motion Analyzer that forms part of the motion field coder of a video encoder, a better rate-distortion performance is achieved than with prior known solutions.

Furthermore, a motion coefficient removal block can be used to compute a plurality of alternate combinations of motion coefficients to be used for further optimization of the rate-distortion performance. Preferably, the motion coefficient removal block is adapted to implement certain cost function to find a combination with which the ultimate rate-distortion will be optimized.

DETAILED DESCRIPTION

Figure 1:
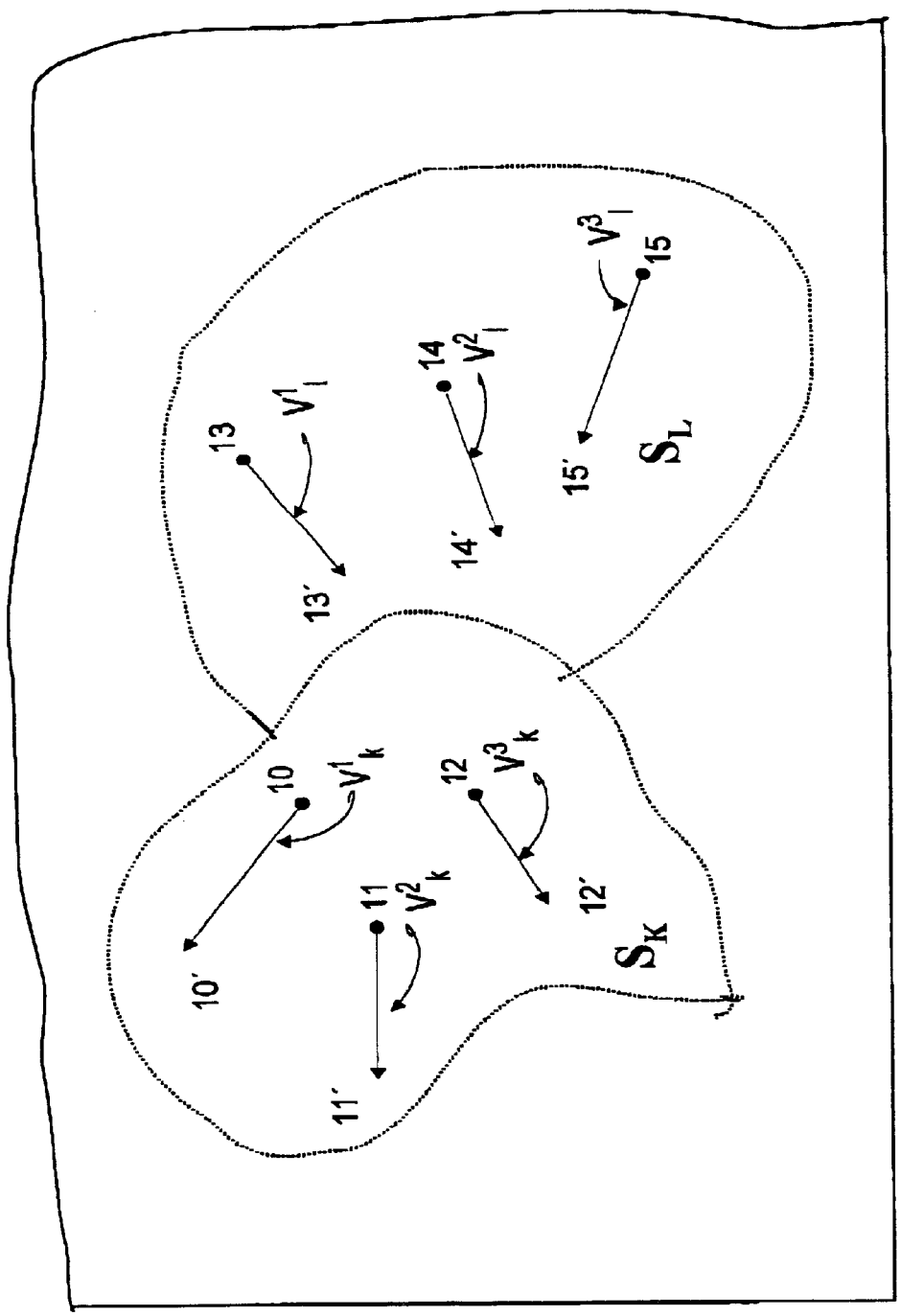
FIG. 1 is a schematic diagram of an image divided in segments.
Figure 2:
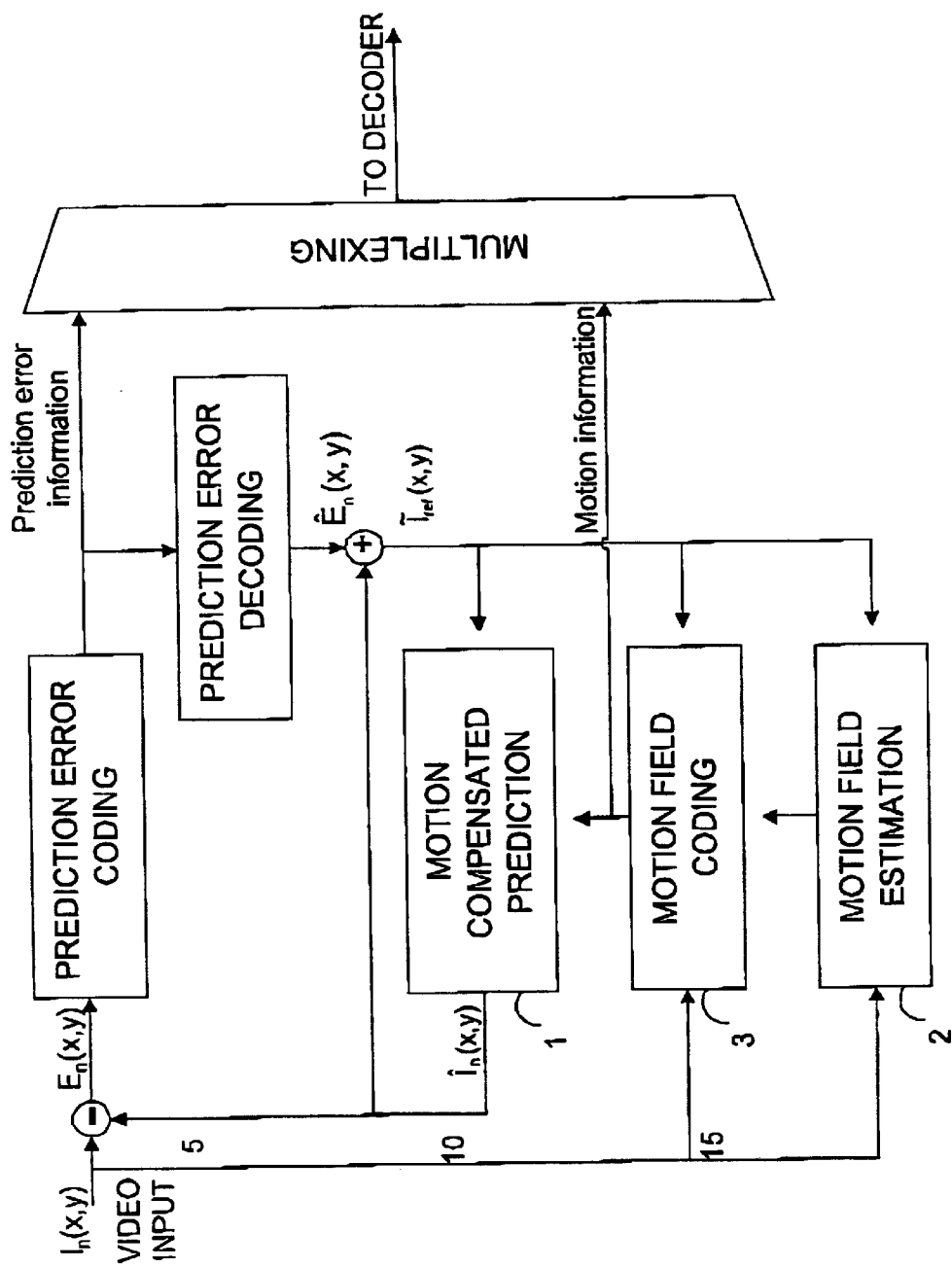
FIG. 2 is a schematic diagram of an encoder according to prior art.
Figure 3:
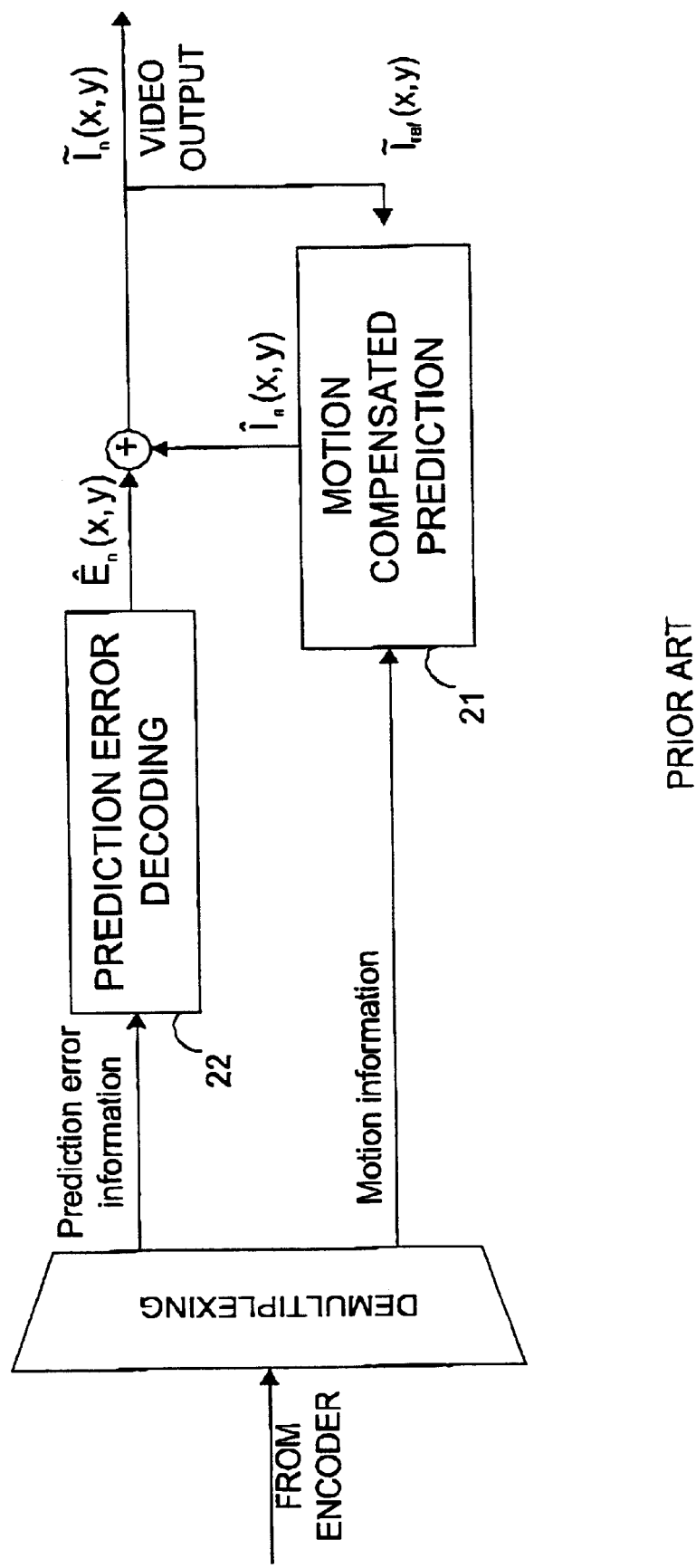
FIG. 3 is a schematic diagram of a decoder according to prior art.

FIGS. 1 to 3 are described above.

In the following, an overview of the invention is provided to facilitate the further description of various embodiments of the invention.

In accordance with a preferred embodiment of the invention, the motion field coder of a video encoder comprises two main blocks.

Figure 4:
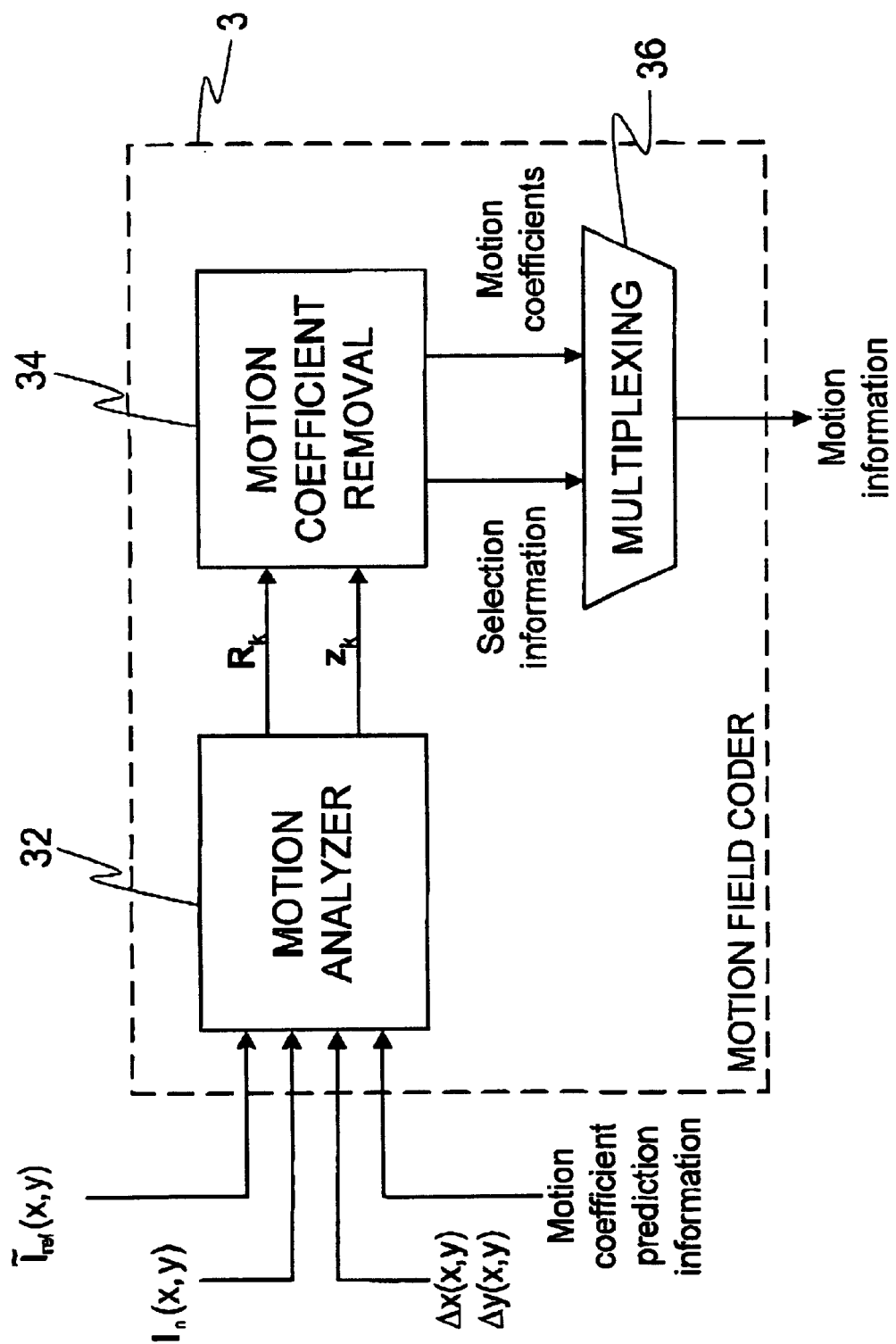
FIG. 4 is a Motion Field Coder according to an embodiment of the invention.
Figure 5:
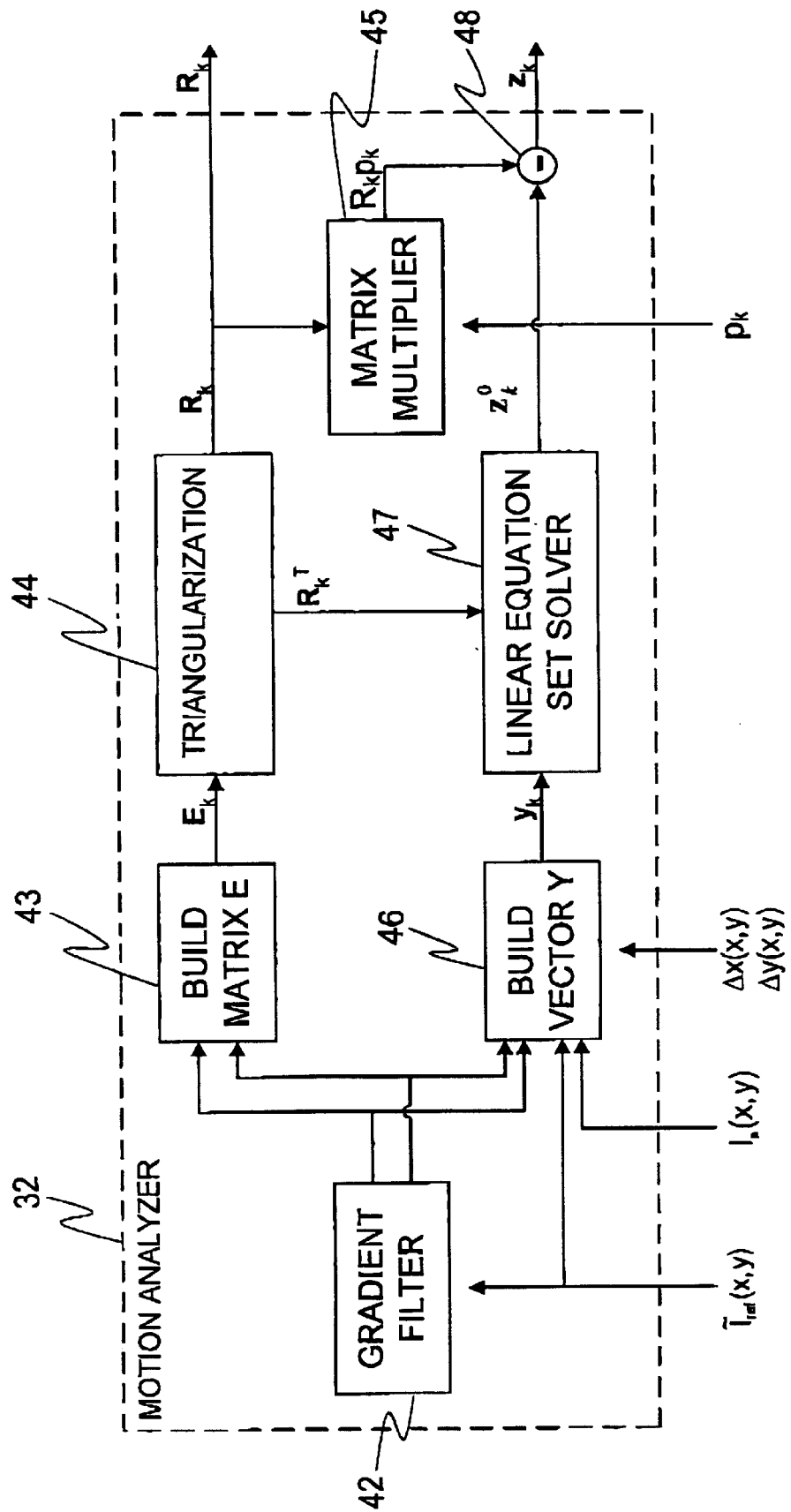
FIG. 5 is a Motion Analyzer according to an embodiment of the invention.

The first main block is called a Motion Analyzer 32, FIGS. 4 and 5. Its task is to find a new representation of the inputted motion field produced by the motion field estimation block 2, FIG. 2. This new representation is applied to the second main block, a motion coefficient removal block 34, FIG. 4. Operations in the Motion Analyzer include a plurality of steps comprising matrix operations: in the first step the prediction frame's dependency on motion vectors is linearized using an approximation method. In the second step, a matrix $A_k$ and a vector $d_k$ are constructed for minimization of the square prediction error. In the third step, a diagonal system of linear equations based on factorization of $A_k$ is built in order to create a flexible motion representation in the form of a diagonal matrix $R_k$ and an auxiliary vector $z_k$.

The Motion Coefficient Removal block 34 inputs the diagonal matrix $R_k$ and the auxiliary vector $z_k$ produced by the Motion Analyzer block. Motion vectors of a segment are represented by a number of motion coefficients. For each of the segments, the motion coefficient removal block determines if it is possible to simplify the motion field model without causing an excessive increase in reconstruction error. Typically, some basis functions are removed from the motion model, whereby fewer coefficients are required to describe such a simplified motion field model.

The Motion Coefficient Removal block 34 modifies matrix equations involving the diagonal matrix $R_k$ by removing one column of the diagonal matrix $R_k$ and triangularizing the new system. As a result, there is one motion coefficient less in the equations and one term is removed from the vector $z_k$. This operation corresponds to removal of one basis function from the motion field model. In order to determine a motion field model which optimizes a selected prediction error measure, or cost function, these operations are repeated until there are no basis functions remaining in the motion field model. Every time a basis function is removed, a new set of motion coefficients is evaluated by solving the matrix equations. This may be done by using any of the well known algorithms, for example, backsubstitution. The final set of motion parameters, i.e. chosen to represent the motion of a particular segment, is the one minimizing the cost function. Preferably, the cost function is a weighted sum of a measure of prediction error and a measure of information required for decoding the image.

For every processed segment, the Motion Coefficient Removal block 34 outputs selection information that defines the basis functions removed from the motion field model. Additionally, it outputs new motion coefficients corresponding to the remaining basis functions. Both the selection information and the new motion coefficients are transmitted to the decoder.

FIG. 4 illustrates a motion field encoder 3 according to an embodiment of the invention. It corresponds to the block 3 in FIG. 2. It inputs the reference frame $\tilde{I}_{ref}(x, y)$, the current frame $\tilde{I}_n(x, y)$, predicted motion coefficients, if any, and the motion vector field $[\Delta x(x, y), \Delta y(x, y)]$ produced by the Motion Field Estimation block 2, FIG. 2.

The output of the video encoder contains a compressed frame divided into segments defined by motion coefficients for a segment $S_k$, which consists of P pixels with coordinates $(x_i, y_i)$, $i=1,2,\ldots P$. The task of the Motion Field Coder is to find the motion coefficients $\tilde{c}=(\tilde{c}_1, \tilde{c}_2, \ldots, \tilde{c}_{N+M})$ of a compressed motion vector field $[\tilde{\Delta}x(\cdot), \tilde{\Delta}y(\cdot)]$ where the motion vectors are described by a linear motion model, the field being of the form:

$$\tilde{\Delta}x(x, y) = \sum_{i=1}^{N} \tilde{c}_i f_i(x, y) \tag{4}$$

$$\tilde{\Delta}y(x, y) = \sum_{i=N+1}^{N+M} \tilde{c}_i f_i(x, y)$$

such that it minimizes a selected cost function, e.g. the Lagrangian cost:

$$L(S_k) = D(S_k) + \lambda R(S_k) \tag{5}$$

Where the distortion $D(S_k)$ is the square error between the original and the coded segment. The rate $R(S_k)$ is equal to the number of bits needed to code the segment and parameter $\lambda$ is a predefined coefficient defining the trade-off between the quality of the coded segment and the number of bits required for the compression of the segment.

To fulfill this task, the Motion Field Coder 3 comprises two main blocks, which are the Motion Analyzer block 32 and the Motion Coefficient Removal block 34. The objective of the Motion Analyzer 32 is to find a new representation of the motion field. This new representation is used later, in the Motion Coefficient Removal block 34, to find motion coefficients for a given image segment in a fast and flexible manner. The Motion Coefficient Removal block 34 reduces the amount of motion information used to describe the motion field of a segment, which results in increase of the square prediction error, defined as $$\sum_{i=1}^{P} (I_n(x_i, y_i) - \tilde{I}_{ref}(x_i + \Delta x(x_i, y_i), y_i + \Delta y(x_i, y_i)))^2 \tag{6}$$

The operation of the Motion Analyzer 32 is next described in detail referring to FIG. 5. The operation of the Motion Analyzer 32 comprises the following steps:

Step 1: Linearization of the error, block 42. In this step the reference frame $\tilde{I}_{ref}(\cdot)$ in formula (6) is approximated using some known approximation method so that its dependency on $[\Delta x(x, y), \Delta y(x, y)]$ becomes linear. Then the elements under the sum in formula (6) become a linear combination of motion coefficients $c_i$ $$\sum_{j=1}^{P} (e_{j,1} c_1 + e_{j,2} c_2 + \ldots + e_{j,N+M} c_{N+M} - y_j)^2 \tag{7}$$

Step 2: Construction of matrices, block 43. Minimization of formula (7) is fully equivalent to minimization of the matrix expression $(E_k c_k - y_k)^T (E_k c_k - y_k)$ or solving the following equation:

$$A_k c_k = d_k \tag{8}$$

where $A_k = E_k^T E_k$ and $d_k = E_k^T y_k$. The vector $y_k$ is built in block 46.

$$E_k = \begin{bmatrix} e_{1,1} & e_{1,2} & \ldots & e_{1,N+M} \\ e_{2,1} & e_{2,2} & \ldots & e_{2,N+M} \\ \vdots & \vdots & \vdots & \vdots \\ e_{P,1} & e_{P,2} & \ldots & e_{P,N+M} \end{bmatrix}, y_k = \begin{bmatrix} y_1 \\ y_2 \\ \vdots \\ y_P \end{bmatrix} \tag{9}$$

Step 3: Triangularization and creation of output, block 44. In this step equation (8) is triangularized using a known method to decompose $A_k$ into a product of a lower diagonal matrix $R_k^T$ and its transpose $R_k$ $$A_k = R_k^T R_k \tag{10}$$

This may be carried out using Cholesky decomposition. An auxiliary vector $z_k^0$ is created solving $$R_k^T z_k^0 = d_k \tag{11}$$

for example, using backsubstitution. The vector of motion coefficients $c_k$ minimizing the formula (7) is now the unknown vector in the diagonal system $$R_k c_k = z_k^0 \tag{12}$$

and can be solved when needed, for example, by using backsubstitution.

The motion coefficients $c_k$ can be given as sums of predicted motion coefficients $p_k$ and refinement motion coefficients $r_k$. The predicted motion coefficients are predicted from previously generated motion coefficients and the refinement motion coefficients correspond to the difference between the predicted motion coefficients and motion coefficients calculated in the Motion Field estimation block (FIG. 2). In this case, equation (12) has the form:

$$R_k(r_k+p_k)=z_k^0 \qquad (13)$$

and, an output vector $z_k$ is created by calculating $$z_k=z_k^0-R_k p_k \qquad (14)$$

Block 47 forms the term $z_k^0$ and block 45 generates the term $R_k p_k$. The output of the following Motion Coefficient Removal block 34 becomes refinement motion coefficients instead of absolute motion coefficients. Otherwise output vector $z_k=z_k^0$.

Motion Coefficient Removal block 34 receives as input matrix $R_k$ and vector $z_k$ produced by the Motion Analyzer block 32. Motion vectors of every segment are represented by N+M motion coefficients.

For a given segment $S_k$, the Motion Coefficient Removal block determines if it is possible to simplify the motion field model, without excessively increasing the selected error measure. A simplified motion field model is obtained when some basis functions are removed from the model in equations (3) described in the background art of this application. Fewer coefficients are required to describe such a simplified motion field model.

The following iterative procedure is performed in order to find the optimal motion vector field.

Step A: Initial cost calculation. A Lagrangian cost for the segment is evaluated with the full motion model and stored together with the full set of motion coefficients.

Step B: Finding the basis function with the smallest impact on prediction quality. Let $R_k^n$ denote an n×n upper diagonal characteristic matrix with n basis functions remaining and $R_k^{n,i}$ the same matrix with the i'th column removed. n sets of equations are generated each with the i'th column removed from the matrix $R_k^n$ and the i'th element removed form the vector $c_k^n$:

$$R_k^{n,i} c_k^{n,i} = z_k^n, \ i=1, \ldots, n \qquad (15)$$

All the equations generated are triangularized in a known manner by applying a series of multiplications of rows by scalars followed by additions of the rows, i.e., equation (15) is converted to the form:

$$\begin{bmatrix} r^j_{1,1} & r^j_{1,2} & r^j_{1,3} & \cdots & r^j_{1,n-1} \\ 0 & r^j_{2,2} & r^j_{2,3} & \cdots & r^j_{2,n-1} \\ 0 & 0 & r^j_{3,3} & \cdots & r^j_{3,n-1} \\ 0 & 0 & 0 & \ddots & \vdots \\ 0 & 0 & 0 & \cdots & r^j_{n-1,n-1} \\ 0 & 0 & 0 & \cdots & 0 \end{bmatrix} \begin{bmatrix} c^i_1 \\ c^i_2 \\ c^i_3 \\ \vdots \\ c^i_{n-1} \end{bmatrix} = \begin{bmatrix} z^i_1 \\ z^i_2 \\ z^i_3 \\ \vdots \\ z^i_{n-1} \\ q_i \end{bmatrix}, i=1, \ldots, n \qquad (16)$$

Where $(q_i)^2$ is an approximation of the increase in the square prediction error due to removing the i'th basis function from the motion model. The column yielding the smallest $(q_i)^2$ when removed is the one to be removed during this iteration, effectively causing the i'th basis function to be removed from the motion model.

Step C: Removing a basis function from the model. A new matrix equation is built by selecting matrix $R_k^{n,i}$ and vector $z_k^{n,i}$ associated with the basis function to be removed and removing the last row of the matrix and the last element of the vector as follows:

$$R_k^{n-1} = \begin{bmatrix} r^j_{1,1} & r^j_{1,2} & r^j_{1,3} & \cdots & r^j_{1,n-1} \\ 0 & r^j_{2,2} & r^j_{2,3} & \cdots & r^j_{2,n-1} \\ 0 & 0 & r^j_{3,3} & \cdots & r^j_{3,n-1} \\ 0 & 0 & 0 & \ddots & \vdots \\ 0 & 0 & 0 & 0 & r^j_{n-1,n-1} \end{bmatrix}, z_k^{n-1} = \begin{bmatrix} z^i_1 \\ z^i_2 \\ z^i_3 \\ \vdots \\ z^i_{n-1} \end{bmatrix} \qquad (17)$$

Step D: Coefficient calculation. A new set of motion coefficients for the reduced set of basis functions is calculated by solving the triangular system:

$$R_k^{n-1} c_k^{n-1} = z_k^{n-1} \qquad (18)$$

e.g. by backsubstitution.

Step E: Cost calculation. A Lagrangian cost for the segment is evaluated and stored together with the set of motion parameters if this model is the best one so far.

Step F: Final motion model selection. If there are still basis functions to be removed, steps B to E are repeated. If all the basis functions have been removed from the model, the output is generated. The output comprises selection information, describing which basis functions should be removed from motion field model, together with new motion coefficients corresponding to the remaining basis functions. Both selection information and motion coefficients are transmitted to the decoder.

The main advantage of the present invention over prior art solutions is its ability to reduce the amount of motion information by a large factor without causing a large increase in reconstruction error. Additionally, the complexity of the overall system is low which allows practical implementation on available signal processors or general-purpose microprocessors.

The Motion Coefficient Removal block is a very powerful tool for instantaneous adaptation of the motion model to the actual amount and type of motion in the video scene. This block can be used to test a large number of motion models, with or without motion parameter prediction. A strong advantage of this scheme is that it does not need to repeat the process of motion estimation when changing motion model and hence it is computationally simple.

By using motion estimation followed by Motion Analyzer the motion field coder can find new motion coefficients for any desired model of the motion field by solving computationally a very simple systems of linear equations.

In the preferred embodiment, an orthonormalized affine motion vector field model with 6 coefficients is used. In practice, this model can handle with a high degree of accuracy even very complex motion in video sequences and yields good prediction results.

The affine motion vector field is a motion model that can be used to approximate motion vectors with a set of motion coefficients. The affine motion model allows description of various types of motion, including translational, rotational, zooming and skewing movements. It comprises 6 basis functions, in which case, the motion vectors may be substantially replaced by a sum involving six basis functions multiplied by motion coefficients, each motion coefficient computed for one particular basis function. The basis functions themselves are known to both the encoder and decoder.

In the Motion Analyzer block 32, linearization in step 1 is performed using Taylor expansion of the reference frame $\tilde{I}_{ref}(x, y)$ at every pixel $(x_i, y_i)$ where $i=1,2,\ldots,P$ (P being the number of pixels in the segment) around points:

$$x'_i = x_i + \Delta x(x_i, y_i)$$

$$y'_i = y_i + \Delta y(x_i, y_i) \tag{19}$$

Using the property that $\Sigma a^2 = \Sigma(-a)^2$, the prediction error is then $$\sum_{i=1}^{P} \left( \tilde{I}_{ref}(x'_i, y'_i) + (\tilde{\Delta}x(x_i, y_i) - \Delta x(x_i, y_i))G_x(x'_i, y'_i) + (\tilde{\Delta}y(x_i, y_i) - \Delta y(x_i, y_i))G_y(x'_i, y'_i) - I_n(x_i, y_i) \right)^2 \tag{20}$$

Auxiliary values $g_j(x, y)$ are calculated using the formula:

$$g_j(x_i, y_i) = \begin{cases} f_j(x_i, y_i)G_x(x'_i, y'_i) & \text{when } j = 1, 2, \ldots, N \\ f_j(x_i, y_i)G_y(x'_i, y'_i) & \text{when } j = N+1, N+2, \ldots, N+M \end{cases} \tag{21}$$

where functions $f_i(x_i, y_i)$ are basis function as defined in equation (4). Matrix $E_k$ and vector $y_k$ in equation (9) are built using formulae:

$$E_k = \begin{bmatrix} g_1(x_1, y_1) & g_2(x_1, y_1) & \cdots & g_{N+M}(x_1, y_1) \\ g_1(x_2, y_2) & g_2(x_2, y_2) & \cdots & g_{N+M}(x_2, y_2) \\ \vdots & \vdots & \vdots & \vdots \\ g_1(x_P, y_P) & g_2(x_P, y_P) & \cdots & g_{N+M}(x_P, y_P) \end{bmatrix} \tag{22}$$

$$y_k = \begin{bmatrix} I_n(x_1, y_1) - \tilde{I}_{ref}(x'_1, y'_1) + G_x(x'_1, y'_1)\Delta x(x_1, y_1) + G_y(x'_1, y'_1)\Delta y(x_1, y_1) \\ I_n(x_2, y_2) - \tilde{I}_{ref}(x'_2, y'_2) + G_x(x'_2, y'_2)\Delta x(x_2, y_2) + G_y(x'_2, y'_2)\Delta y(x_2, y_2) \\ \vdots \\ I_n(x_P, y_P) - \tilde{I}_{ref}(x'_P, y'_P) + G_x(x'_P, y'_P)\Delta x(x_P, y_P) + G_y(x'_P, y'_P)\Delta y(x_P, y_P) \end{bmatrix} \tag{23}$$

$G_x(x, y)$ and $G_y(x, y)$ are values of the horizontal and vertical gradient of the reference frame $\tilde{I}_{ref}(x, y)$ calculated using the derivative of the well known cubic spline interpolation function.

Matrix $A_k$ is factorized using Cholesky decomposition and the system in formula (15) is triangularized using a sequence of Givens rotations.

Motion coefficients for new motion models are calculated by solving equation (18) using a backsubstitution algorithm.

The pixel values of $\tilde{I}_{ref}(x, y)$, $G_x(x, y)$ and $G_y(x, y)$ are defined only for integer coordinates of x and y. When x or y are non-integers the pixel value is calculated using cubic spline interpolation using integer pixel values in the vicinity of x and y.

Figure 6:
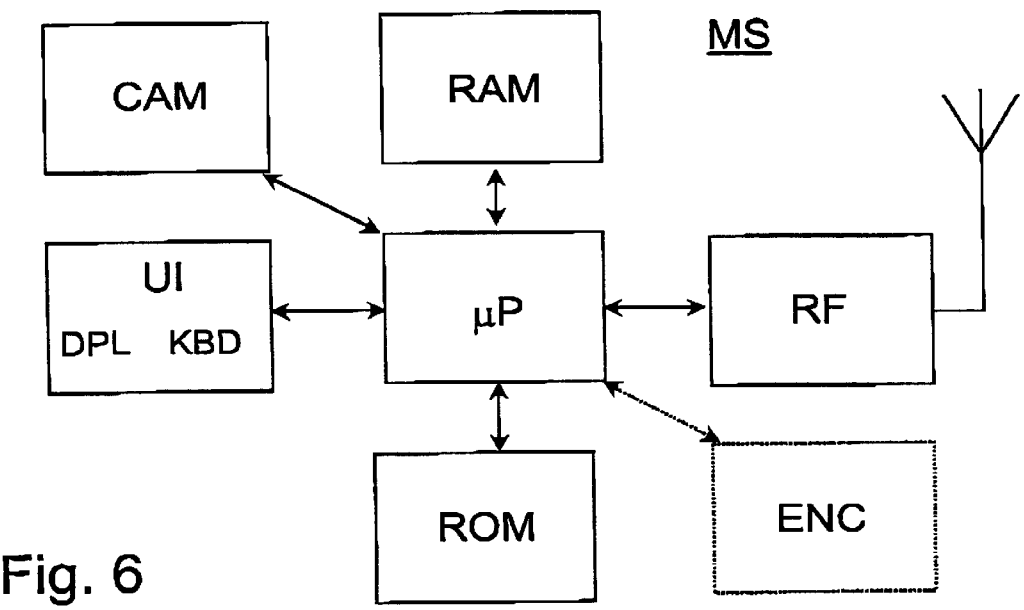
FIG. 6 is a schematic diagram of a mobile station according to an embodiment of the invention.

FIG. 6 shows a mobile station MS according to an embodiment of the invention. A central processing unit, microprocessor $\mu P$ controls the blocks responsible for different functions of the mobile station: a random access memory RAM, a radio frequency block RF, a read only memory ROM, a user interface UI having a display DPL and a keyboard KBD, and a digital camera block CAM. The microprocessor's operating instructions, that is program code and the mobile station's basic functions have been stored in the mobile station in advance, for example during the manufacturing process, in the ROM. In accordance with its program, the microprocessor uses the RF block for transmitting and receiving messages on a radio path. The microprocessor monitors the state of the user interface UI and controls the digital camera block CAM. In response to a user command, the microprocessor instructs the camera block CAM to record a digital image into the RAM. Once the image is captured or alternatively during the capturing process, the microprocessor segments the image into image segments and computes motion field models for the segments in order to generate a compressed image as explained in the foregoing description. A user may command the mobile station to display the image on its display or to send the compressed image using the RF block to another mobile station, wired telephone, facsimile device or another telecommunications device. In a preferred embodiment, such transmission of image is started as soon as the first segment is encoded so that the recipient can start decoding process with a minimum delay. In an alternative embodiment, the mobile station comprises an encoder block ENC dedicated for encoding and possibly also for decoding of digital video data.

Figure 7:
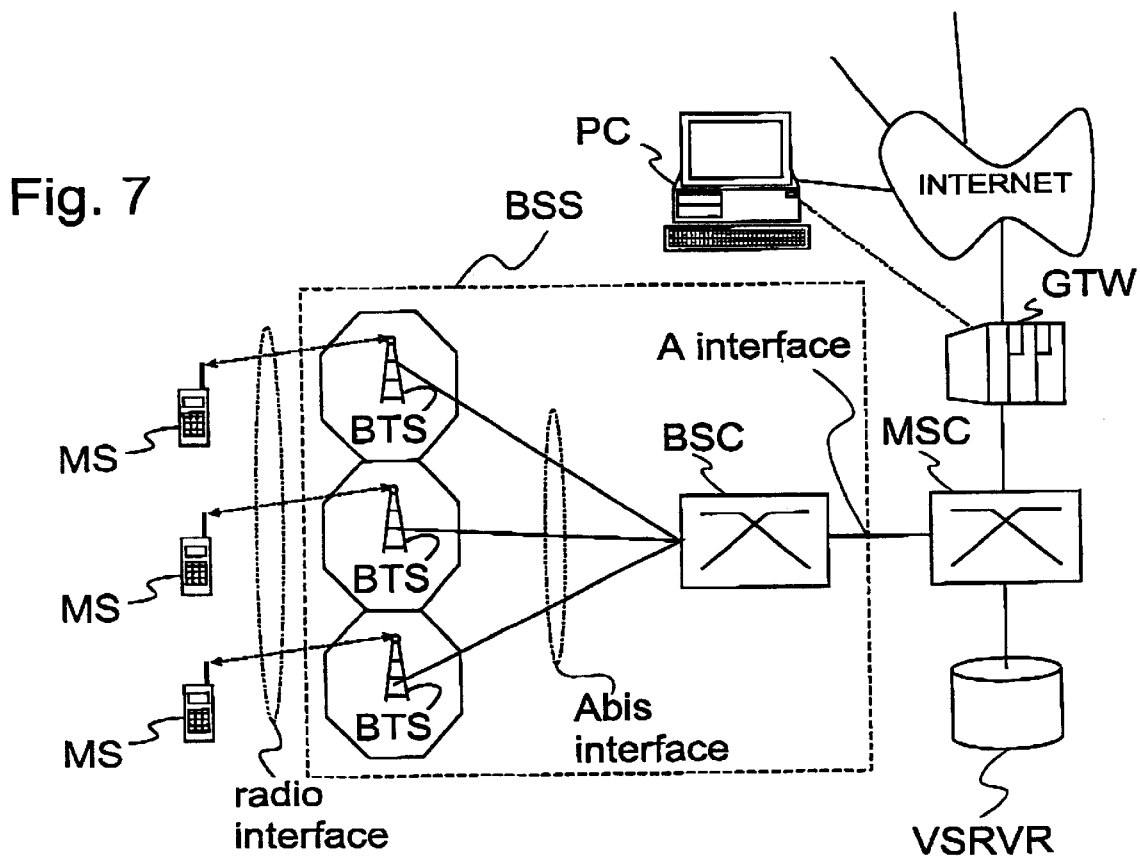
FIG. 7 is a schematic diagram of a mobile telecommunications network according to an embodiment of the invention.

FIG. 7 is a schematic diagram of a mobile telecommunications network according to an embodiment of the invention. Mobile stations MS are in communication with base stations BTS by means of a radio link. The base stations BTS are further connected, through a so-called Abis interface, to a base station controller BSC, which controls and manages several base stations. The entity formed by a number of base stations BTS (typically, by a few dozen base stations) and a single base station controller BSC, controlling the base stations, is called a base station system BSS. Particularly, the base station controller BSC manages radio communication channels and handovers. On the other hand, the base station controller BSC is connected, through a so-called A interface, to a mobile services switching centre MSC, which co-ordinates the formation of connections both from and to mobile stations. A further connection is made, through the mobile service switching centre MSC, to outside the mobile communications network. Outside the mobile communications network there may further reside other network(s) connected to the mobile communications network by gateway(s) GTW, for example the Internet. In such external network, or in the telecommunications network, there may be located another video decoding or encoding stations, such as computers PC. In an embodiment of the invention, the mobile telecommunications network comprises a video server VSRVR to provide video data to a MS subscribing to such a service. This video data is compressed by using the motion compensated video compression method as described earlier in this document. The video server may function as a gateway to an online video source or it may comprise previously recorded video clips.

The system can be implemented in a variety of ways without departing from the spirit and scope of the invention. For instance:

Different motion models can be used.

Different cost functions can be used instead of the Lagrangian cost given in equation (5).

Different methods can be used to linearize the term in formula (6).

Different factorization algorithms can be used in the Motion Analyzer (e.g. QR decomposition instead of Cholesky decomposition).

The strategy for deciding the removal order of basis functions may vary (e.g. a predefined order can be used instead of evaluating $q_i$'s in equation (16)).

Some motion models can be skipped in the Motion Coefficient Removal block (e.g. if some input coefficients have negligible amplitude, algorithm may decide to discard corresponding basis functions).

Cost calculation in the Motion Coefficient Removal block does not have to take place immediately after removal of a basis function but can be delayed. This means that in the Coefficient Removal block Steps B–D may be iterated instead of steps B–E. Step E (cost calculation) can then be performed in another loop for all the generated motion models (for this segment).

Triangularization of the system in equation (15) can be performed using various algorithms.

Calculation of final coefficients by solving equation (18) can be performed using a number of known algorithms for solving systems of linear equations.

Prediction terms in equations (13) and (14) can be incorporated alternatively by substituting motion vectors $(\Delta x(x_i, y_i)$ and $\Delta y(x_i, y_i))$ in equation (23) by motion vector refinements (differences between estimated motion vectors and predicted motion vectors).

Different interpolation methods can be used to obtain values of $\tilde{I}_{n-1}(x, y)$, $G_x(x, y)$ and $G_y(x, y)$ in non-integer coordinates.

What is claimed is:

1. A video codec for motion compensated encoding of video data comprising:

means for generating a motion vector field of video pixels of a current frame to be coded based on a reference frame;

means for obtaining segmenting information defining the division of the current frame into image segments;

a motion field coder for coding the motion vector field of an image segment $S_k$ to provide compressed motion information comprising a motion coefficient vector $c_k$ comprising a set of motion coefficients $c_i$, such that $c_i \cdot f_i(x,y)$ represents the motion vector field, whereby $f_i(x,y)$ defines a certain set of basis functions, wherein i is an index defining a correspondence between each basis function and a corresponding motion coefficient;

prediction means for predicting a motion vector field of a subsequent image segment $S_L$ with a set of predicted motion coefficients $p_i$ based upon the previously generated motion coefficient vector $c_k$;

means for generating for the subsequent segment $S_L$ a set of refinement motion coefficients $r_i$ corresponding to the difference between the set of motion coefficients $c_i$ and a set of predicted motion coefficients $p_i$ such that $p_i + r_i = c_i$.

2. A video codes according to claim 1, having a Motion Analyzer comprising:

means for calculating an approximation matrix $E_L$ and an approximation vector $y_L$ for the subsequent image segment $S_L$;

means for calculating a predefined distortion measure of the subsequent segment as a function of $E_L c_L - y_L$, $c_L$ being a vector of motion coefficients $c_i$ for approximating said motion vector field of the subsequent image segment $S_L$ together with the set of basis functions;

means for generating output parameters including a diagonal output matrix $R_L$ and an output vector $Z_L$.

3. A video codec according to claim 2, the motion vector field being represented by an affine model.

4. A video codec according to claim 2, further comprising:

a coefficient removal block for reducing the number of motion coefficients for reducing at least one motion coefficient in order to generate at least two alternative sets of motion coefficients;

means for calculating a cost of for a set of motion coefficients; and means for selecting the set of motion coefficients that results in the minimum cost among the alternative sets of motion coefficients.

5. A video codec according to claim 4, the cost being a function of a video coding error and amount of data required to code an image segment with the set of motion coefficients.

6. A video codec according to claim 2, wherein matrix $R_L$ is arranged to be obtained by decomposing matrix $A_L = E_L^T E_L$ into a lower diagonal matrix $R_L^T$ and its transpose $R_L$ so that $A_L = R_L^T R_L$.

7. A video codec according to claim 2, wherein vector $z_L$ is arranged to be obtained by calculating $d_L = E_L^T y_L$ and solving the set of equations $R_L^T z_L = d_L$.

8. A video codec according to claim 2, wherein vector $z_L$ is arranged to be obtained by calculating $d_L = E_L^T y_L$, solving the set of equations $R_L^T z_L^0 = d_L$ and calculating $z_L = z_L^0 - R_L p_L$ when motion parameter prediction vector $p_k$ is present.

9. A storage device comprising a video codec according to claim 1.

10. A mobile station comprising a video codec according to claim 1.

11. A mobile telecommunications network comprising a video codec according to claim 1.

12. A computer program product comprising a video codec according to claim 1.

13. A method for motion compensated encoding of video data comprising the steps of:

generating a motion vector field of video pixels of a current frame to be coded based on a reference frame;

obtaining segmenting information defining the division of the current frame into image segments;

coding the motion vector field of an image segment $S_k$ to provide compressed motion information comprising a motion coefficient vector $c_k$ comprising a set of motion coefficients $c_i$, such that $c_i \cdot f_i(x,y)$ represents the motion vector field, whereby $f_i(x,y)$ defines a certain set of basis functions, wherein i is an index defining a correspondence between each basis function and a corresponding motion coefficient;

predicting a motion vector field of a subsequent image segment $S_L$ with a set of predicted motion coefficients $P_i$ based upon the previously generated motion coefficient vector $c_k$;

generating for the subsequent segment $S_L$ a set of refinement motion coefficients $r_i$ corresponding to the difference between the set of motion coefficients $c_i$ and a set of predicted motion coefficients $p_i$ such that $p_i+r_i=c_i$.

14. A method according to claim 13, further comprising the steps of:

calculating an approximation matrix $E_L$ and an approximation vector $y_L$ for the subsequent image segment $S_L$;

calculating a predefined distortion measure of the subsequent segment as a function of $E_L c_L - y_L$, $c_L$ being a vector of motion coefficients $c_i$ for approximating said motion vector field of the subsequent image segment $S_L$ together with the set of basis functions;

generating output parameters including a diagonal output matrix $R_L$ and an output vector $z_L$.

15. A method according to claim 14, wherein the motion vector field is represented by an affine model.

16. A method according to claim 14, further comprising the steps of:

reducing the number of motion coefficients for reducing at least one motion coefficient in order to generate at least two alternative sets of motion coefficients;

calculating a cost of for a set of motion coefficients; and selecting the set of motion coefficients that results in the minimum cost among the alternative sets of motion coefficients.

17. A method according to claim 16, the cost being a function of a video coding error and amount of data required to code an image segment with the set of motion coefficients.

18. A method according to claim 14, further comprising the step of obtaining matrix $R_L$ by decomposing matrix $A_L = E_L^T E_L$ into a lower diagonal matrix $R_L^T$ and its transpose $R_L$ so that $A_L = R_L^T R_L$.

19. A method according to claim 14, further comprising the step of obtaining vector $z_L$ by calculating $d_L = E_L^T y_L$ and solving the set of equations $R_L^T z_L = d_L$.

20. A method according to claim 14, further comprising the steps of obtaining vector $z_L$ by calculating $d_L = E_L^T y_L$, solving the set of equations $R_L^T z_L^0 = d_L$; and calculating $z_L = z_L^0 - R_L p_L$ when motion parameter prediction vector $p_k$ is present.

* * * * *